US010528858B1

(12) United States Patent
Murphy et al.

(10) Patent No.: US 10,528,858 B1
(45) Date of Patent: Jan. 7, 2020

(54) METHODS AND ARRANGEMENTS TO DETECT A PAYMENT INSTRUMENT MALFUNCTION

(71) Applicant: Capital One Services, LLC, McLean, VA (US)

(72) Inventors: Mallory Murphy, Toronto (CA); Mark Yamashita, Toronto (CA)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/182,578

(22) Filed: Nov. 6, 2018

(51) Int. Cl.
| | | |
|---|---|---|
| *G06K 19/07* | (2006.01) | |
| *G06K 19/06* | (2006.01) | |
| *G06N 7/00* | (2006.01) | |
| *G06N 3/08* | (2006.01) | |

(52) U.S. Cl.
CPC ... *G06K 19/0722* (2013.01); *G06K 19/06187* (2013.01); *G06N 3/08* (2013.01); *G06N 7/005* (2013.01)

(58) Field of Classification Search
CPC .................................................... G06K 19/00
USPC ............................... 235/492, 487, 375, 379
See application file for complete search history.

(56) References Cited

U.S. PATENT DOCUMENTS

| | | | | |
|---|---|---|---|---|
| 2002/0103663 A1* | 8/2002 | Bankier | ............... | G06Q 20/00 |
| | | | | 709/224 |
| 2011/0154497 A1* | 6/2011 | Bailey, Jr. | .......... | H04L 63/0861 |
| | | | | 726/25 |
| 2014/0166745 A1* | 6/2014 | Graef | .................... | G07F 19/00 |
| | | | | 235/379 |
| 2016/0260086 A1* | 9/2016 | Cho | .................. | G06Q 20/3278 |

OTHER PUBLICATIONS

Author Unknown., "What Credit Unions Should Know About Fallback Transactions", Insights by Card Services for Credit Unions, 2015.
Author Unknown. "EMV Implementation Guidance: Fallback Transactions", EMV Migration Forum and Smart Card Alliance, Nov. 2015.

* cited by examiner

*Primary Examiner* — Edwyn Labaze

(57) ABSTRACT

Logic may detect a malfunctioning payment interface on a customer's payment instrument. Logic may receive transaction data about at least one transaction performed via a payment instrument associated with a customer. The transaction data may indicate a payment interface of the payment instrument through which the customer conducted the at least one transaction and the payment instrument may comprise one or more payment interfaces. Logic may determine, by a model, based on the transaction data, a probability of a malfunction by at least one interface of the one or more payment interfaces. The model may be trained based on a pattern of transactions associated with malfunctioning payment instruments. Logic may compare the probability of the transaction against a threshold. And logic may determine whether to contact a customer associated with the payment instrument, based comparison of the probability of the transaction against the threshold.

20 Claims, 7 Drawing Sheets

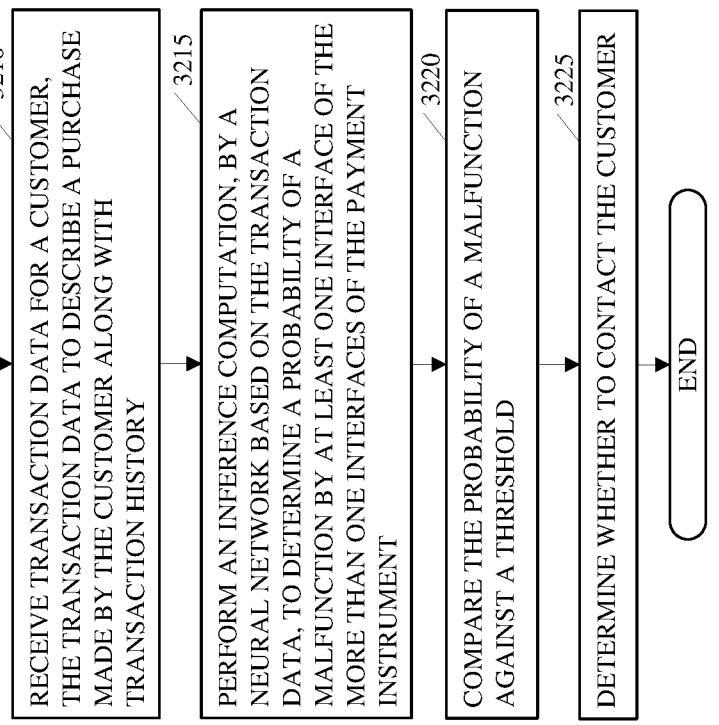
FIG. 3A
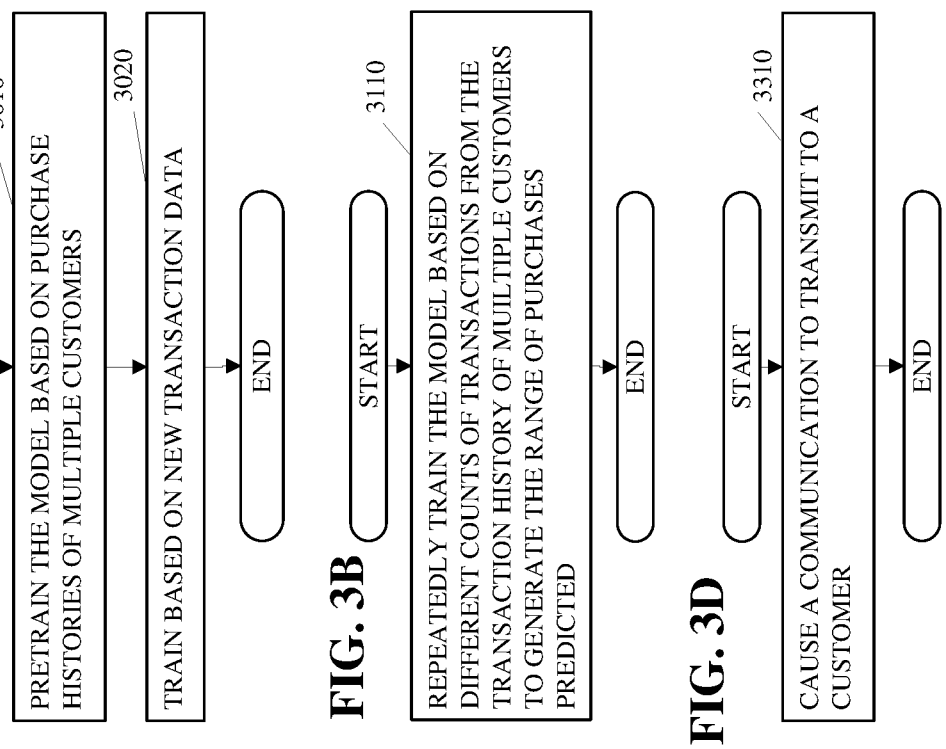
FIG. 3C
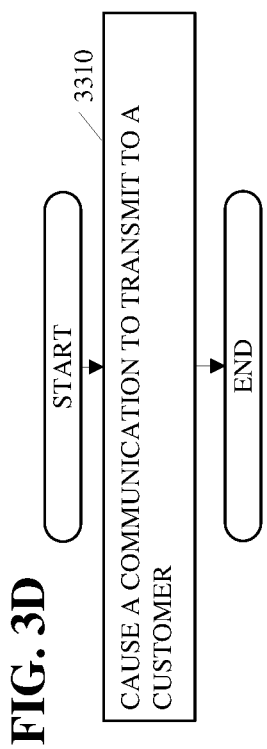

METHODS AND ARRANGEMENTS TO DETECT A PAYMENT INSTRUMENT MALFUNCTION

TECHNICAL FIELD

Embodiments described herein are in the field of malfunction detection. More particularly, the embodiments relate to methods and arrangements to detect a malfunctioning payment interface of a payment instrument based on transaction data.

BACKGROUND

A modern credit card has three primary methods of making an in-person transaction with a merchant: tap, chip, and swipe. Each method relies on different technology embedded within the credit card, and one payment method may fail while the other two continue to function. For instance, an induction loop within the credit card may break, causing the tap functionality to stop working, but the chip and swipe functionality may be unaffected.

Such malfunctions may not be detectable through visual inspection of the credit card, so the customer may not realize why a transaction with the tap is failing. This may lead to unsatisfactory customer experience.

SUMMARY

Embodiments may include methods and arrangements such as methods, devices, apparatuses, systems, storage media, and the like. For example, a first embodiment may include an apparatus. The apparatus may comprise memory; and logic circuitry coupled with the memory to receive transaction data about at least one transaction performed via a payment instrument associated with a customer. The transaction data may indicate a payment interface of the payment instrument through which the customer conducted the at least one transaction. The payment instrument may comprise one or more payment interfaces. The logic circuitry coupled with the memory may determine, by a model, based on the transaction data, a probability of a malfunction by at least one interface of the one or more payment interfaces, wherein the model is trained based on a pattern of transactions associated with malfunctioning payment instruments. The logic circuitry coupled with the memory may compare the probability of the malfunction against a threshold and determine whether the at least one interface is malfunctioning based comparison of the probability of the malfunction against the threshold.

A second embodiment may include a non-transitory storage medium containing instructions, which when executed by a processor, cause the processor to perform operations. The operations may, based on transaction data about at least one transaction performed via a payment instrument associated with a customer, the transaction data to indicate a payment interface of the payment instrument through which the customer conducted the at least one transaction, the payment instrument comprising one or more payment interfaces; determine, by a model, a deviation from a transaction pattern by at least one interface of the one or more payment interfaces. The model is trained based on the transaction data. The transaction data may be indicative of a past spending behavior of the customer. And the operations may determine, based on a threshold, to contact a customer associated with the payment instrument.

A third embodiment may include a system. The system may comprise memory and logic circuitry coupled with the memory to provide transaction data associated with more than one customer. The logic circuitry coupled with the memory may identify for multiple customers of the more than one customer, a request to obtain a new payment instrument. The logic circuitry coupled with the memory may determine, for multiple customers of the more than one customer, a set of transaction data indicative of a transaction pattern leading to the request to obtain the new payment instrument. And the logic circuitry coupled with the memory may train a model based on the set of transaction data for the multiple customers, the model to output, in inference mode, a probability based on a deviation from transaction patterns that lead to the requests to obtain new payment instruments.

BRIEF DESCRIPTION OF THE DRAWINGS

FIGS. 3A-E depict flowcharts of embodiments to pretrain a model, perform malfunction detection with a model, and communicate with a customer, by malfunction detection logic circuitry, such as the malfunction detection logic circuitry shown in FIGS. 1A, 1C, and 2;

DETAILED DESCRIPTION OF EMBODIMENTS

Figure 1B:
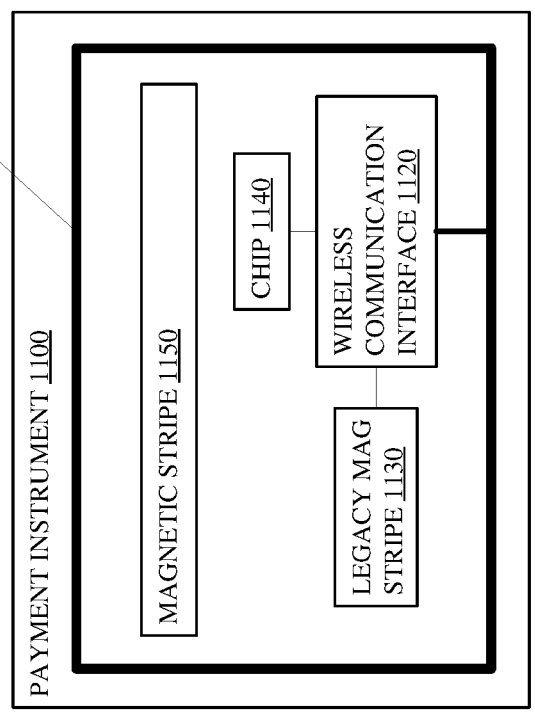
FIG. 1B depicts an embodiment of a payment instrument with multiple payment interfaces to process transactions with point-of-sale terminals such as the point-of-sale terminals in FIG. 1A.

The following is a detailed description of embodiments depicted in the drawings. The detailed description covers all modifications, equivalents, and alternatives falling within the appended claims.

Customers may begin to rely on one or more payments instruments such as credit cards to perform transactions. Many customers have typical, repetitive, or periodic expenses for which they rely on one or more credit cards. For instance, customers may use one or more credit cards to purchase gas for their vehicles once a week, eat lunch at a restaurant or cafeteria a few times a week, pick up groceries a few times a month, and/or the like. Some customers fall into a routine in which they use the same payment instrument to perform most of the day-to-day transactions because they prefer use of that card for one reason or another.

Many payment instruments are plastic or metal credit cards that include payment interfaces of various technologies to conduct transactions for customers. The payment interfaces may include a magnetic stripe including information associated with the customer that a card reader can read to process a transaction. Magnetic stripes contain magnetically-stored information for conducting a transaction and are typically applied to credit cards as a hot foil tape. In many embodiments, the credit cards include a high-coercivity magnetic stripe that requires a higher magnetic energy to record (e.g., 4000 oersted (Oe)) than medium-coercivity (e.g., 2750 Oe) and low-coercivity (e.g., 300 Oe). The higher magnetic energy to record may improve the resistance of the magnetic stripe to erasure but, if a card becomes exposed to a high magnetic energy or becomes worn through repeated use or other, the magnetic stripe may become difficult to read. In fact, the magnetic stripe may slowly deteriorate, causing card readers of point-of-sale (POS) terminals to fail.

Payment instruments may also comprise a chip such as a microchip with contacts as a payment interface and such payment instruments are often referred to as Chip and PIN (personal identification number) or Chip and Signature cards. The chip may be a processor that is a contacted payment interface. With the Chip and PIN cards, the POS terminal, if it has the corresponding capabilities, may verify the identity of the customer with a PIN via the chip, whereas Chip and Signature cards require a signature to verify the identity of the customer. In some embodiments, the chip may also generate a packet for transmission to the payment instrument issuer such as an encrypted packet with a random number that can verify the operation of the chip and the association of the chip with the customer's account. Chips may fail for different reasons such as wearing of the contacts through repeated use or other factors.

Payment instruments may also comprise a contactless payment interface such as a near field communications (NFC) payment interface. In some embodiments, the contactless payment interface may comprise a legacy magnetic stripe radio frequency identifier (RFID) tag and, in further embodiments, the contactless payment interface may comprise an NFC payment interface coupled with the chip. Either or both of such contactless payment interfaces may include an antenna that is typically embedded in the payment instrument and encircles a portion of the payment instrument. The antenna enables reception of radio signals and for interacting with a tap type payment interface on a POS terminal and is susceptible to breakage.

Any one or all the payment interfaces can break over time or instantaneously, causing a customer to experience issues with conducting transactions with POS terminals via one or more of the payment interfaces. Such interactions can develop transaction data descriptive of issues with a particular payment interface that is transmitted to the payment instrument issuer in response to completion of a transaction. Other customers may, however, stop using the faulty payment interface or stop using the payment instrument with the faulty interface without repeatedly trying to process the transaction with the faulty or malfunctioning payment interface. In either case, the customer may portray the problem with the malfunctioning payment interface through a deviation from a normal or typical behavioral pattern that is exhibited as a pattern in the transactions conducted by the customer.

To illustrate, when one payment interface stops working, a customer may opt to use another credit card instead of going through the process of having their credit card replaced. For instance, assume a customer has two credit cards, A and B, where credit card A is their primary card. If the tap interface for credit card A stops working, the customer may not know why the payment interface does not work and may just decide to use credit card B for small purchases (eligible for tap payments), instead of using the chip or swipe functionality of credit card A. This will result in customer dissatisfaction with the credit card, a corresponding reduction in purchase volume for credit card A, and the potential for credit card A to lose its status as first-in-wallet, which is a preferred card status.

Contemporary systems may determine a payment interface failure at the point-of-sale terminal or other credit card terminal, but the point-of-sale terminal may be unable to distinguish between a failure in the payment interface of the payment instrument and a failure in the payment interface of the point-of-sale terminal. If the customer or merchant continues to attempt to use the same payment interface unsuccessfully, the point-of-sale terminal may instruct the customer or merchant to initiate a fallback transaction. For instance, the point-of-sale terminal may instruct the customer or merchant to attempt to process the transaction with the chip if the tap repeatedly fails and with the magnetic stripe if the chip repeatedly fails. An increase in fallbacks, particularly fallbacks related to a faulty chip can be indicative of a chip malfunction and fallbacks related to chips are typically declined. Thus, fallbacks can be a good indicator that a payment interface of a payment instrument is malfunctioning. POS terminals may report fallbacks and declines in authorization data, which is a type of transaction data as discussed herein.

While the POS terminal may report fallback transactions to the credit card issuer, such information does not distinguish between a malfunction of a payment interface of a POS terminal and a malfunction of a payment interface of a credit card. Moreover, customers that encounter a problem with, e.g., a tap interface to pay for, e.g., a coffee, may decide to switch to a second credit card and process the transaction with a tap of the second credit card. In such situations, the credit card issuer does not even receive an indication of a fallback transaction. The credit card issuer of the card with the malfunctioning tap interface may receive no indication that the customer attempted to use the credit card.

Embodiments may implement a model with machine learning algorithms or other mathematical algorithms, such as a neural network or other prediction, classification, or clustering algorithm, to identify changes in transaction behavior by a customer that may indicate a payment instrument, such as a credit card, has one or more malfunctioning payment interfaces that occasionally or permanently cause a failure to complete a payment via one or more transaction modes. Some embodiments implement models that use the information provided through transaction records to deterministically identify a failure in a single payment mode (for instance, repeated failures of one payment interface). Other embodiments use machine learning to process this information to strengthen the recognition of payment interface failures.

To prepare a model for determination of a probability of a malfunction of a payment interface, malfunction logic circuitry may train the model using past or historical transaction data from multiple customers. By training the model with data from multiple customers, the model can assess the likelihood, or probability, that the customer's behavior, in terms of conducting transactions, indicates a payment interface malfunction, that the payment instrument will malfunction in future transactions, or the like.

Some embodiments may select transaction data from various customers historical transaction data based on availability to the payment instrument issuer. For instance, the payment instrument issuer may have access to transaction data such as authorization data provided by a POS terminal for authorization of a transaction, internal information about a request to replace a payment instrument, and/or the like. The authorization data may include, e.g., the date and time of the authorization, a POS entry mode (or transaction mode) used for authorization, an indication regarding the use of a fallback transaction for the authorization, and/or the like. The internal information may include, for instance, information about a request type or reason for requesting the last payment instrument issued on an account, the date of the last payment instrument request on the account, and/or the like.

Many embodiments split the transaction data into training data and testing data. The model may train with the training data and test the accuracy of the probability output by calculating probabilities in inference mode based on the testing data. The transaction data may include historical transaction data (also referred to as the purchase history) from a database of actual, modified, and/or synthesized transaction data. In several embodiments, the transaction data is from or is based on historical transaction data from multiple customers. In further embodiments, the transaction data is selected based on a correlation between the data and a customer request for issuance of a new payment instrument. For example, a customer whom typically uses the tap interface on a first credit card may call to request reissuance of the first credit card after recognition that the tap interface is not being accepted by a POS of a retailer at which the customer typically shops.

The transaction data for the customer for, e.g., the last two weeks prior to the customer's request to reissue the first credit card may show a change in a transaction behavior from typical, repetitive transaction behavior to transaction behavior influenced by a failing or failed payment interface. For example, the customer may display a behavioral pattern frequenting one or more specific retailers and conducting transactions with the tap interface of the customer's first credit card. In some instances, the customer may stop using the tap interface at those retailers and/or the customer may begin to use a different payment interface of the same payment instrument such as the chip or magnetic stripe of the first credit card.

In further embodiments, the customer may indicate that the customer's reason for requesting the new card is that the tap interface does not seem to work. In such embodiments, the payment instrument issuer may note this request and the reason for the request as internal transaction data associated with the customer. For instance, the payment instrument issuer may store the reason that the customer offers for requesting the reissuance of the first credit card as an indicator of a suspected malfunction of the credit card or an indicator that the reason offered by the customer does not fall within other categories of reasons for requesting reissuance.

In many embodiments, the models such as neural networks or other mathematical models may pretrain on a server of, e.g., a payment instrument issuer, with function approximation, logistic regression analysis, or classification to output a probability that a time series of transactions for a customer indicates that one or more payment interfaces of the payment instrument are malfunctioning. In general, the training data may train the model to identify a pattern as being a pattern associated with a malfunctioning payment interface by training the model with multiple time series of transactions that led up to a customer requesting the reissuance of a payment instrument. The models may, through various different methods, learn to detect a behavioral pattern through training the models with many time series of transactions, determining an error between the output and an expected output, and back propagating the error through the layers of the model to adjust weights and biases associated with compute nodes within the layers.

In some embodiments, a model may train with training data that includes typical patterns of behavior of customers, so the model can determine a probability that the customer's deviation from the typical behavioral patterns indicate that a payment interface of the customer's payment instrument is malfunctioning. In some embodiments, a model may train with training data that includes typical behavioral patterns that lead to a request for reissuance of a payment instrument by customers, so the model can predict, classify, or cluster to detect a behavioral pattern of a customer with a probability that the behavioral pattern is similar to or the same as one of the behavioral patterns that typically leads to the customer requesting reissuance of a payment instrument. In some embodiments, a model may train with training data that includes synthesized transaction data to display patterns of behavior that are considered to indicate that a payment interface of a payment instrument is malfunctioning, so the model can predict, classify, or cluster to detect a behavioral pattern of a customer with a probability that the behavioral pattern is similar to or the same as one or more of the synthesized behavioral patterns. Through, e.g., supervised training, the probabilities of each of these types of training can be improved. Furthermore, several embodiments combine one or more of or all the above types of training data to train a model.

Note that while the model is trained to detect a pattern of transactions that represents a probability that one or more payment interfaces of the payment instrument are malfunctioning, malfunction detection logic circuitry may detect a malfunction based on a determination by the model of the error associated with predicting a transaction conducted by the customer or classifying the transaction conducted by the customer. In other words, the model may learn a behavioral pattern of the customer from historical transaction data and determine the probability that a pattern of one or more recent transactions represent a malfunctioning payment instrument interface based on deviation from that behavioral pattern. When data for a transaction is input at the input layer of the model that matches a predicted transaction based on the learned behavioral pattern, the model may output an error that is small to indicate a low probability that the transaction indicates a malfunctioning payment instrument interface because the transaction closely matches a predicted transaction or a transaction classification. On the other hand, when data for a transaction is provided at the input layer of the model that is not predicted by the model, the model may output a large error indicating that the transaction does not match a predicted transaction well or a transaction classification well. Thus, the malfunction detection logic circuitry may determine if a transaction is likely indicative of a malfunctioning payment instrument by comparing the error output by the model to a deviation threshold. For transactions in which the output error falls below the deviation threshold, the malfunction detection logic circuitry may consider the transaction to be predictable based on the learned behavioral pattern. For transactions in which the output error reaches or exceeds the deviation threshold, the malfunction detection logic circuitry may consider the transaction to be indicative of a malfunctioning payment instrument interface.

Function approximation may involve time series prediction and modeling to generate a probability. A time series is a series of data points indexed (or listed or graphed) in time order. As discussed herein, a time series is a sequence of discrete-time transaction data related to transactions conducted at a discrete time of the day, day of the week, week of the month, month of the year, and/or the like, to classify the transaction data. Some models may perform time series analysis to extract meaningful statistics and other characteristics of the transaction data to predict a probability of future values being indicative of a malfunctioning payment interface based on previously observed values.

Classification may involve pattern and sequence recognition, novelty detection, and the like. For instance, some models may perform sequence learning such as sequence prediction and sequence recognition to classify transactions with a probability that a payment interface is malfunctioning.

Examples of neural networks to output the probability of a malfunctioning payment interface may include a deep neural network, a recurrent neural network, a gradient boosting engine, and/or the like. Examples of mathematical models to output the probability of a malfunctioning payment interface may include stochastic processes.

In many embodiments, the output of a trained model is a probability that one or more payment interfaces of a payment instrument is malfunctioning. If the probability meets a certain threshold, the payment instrument issuer can proactively replace the customer's payment instrument, proactively offer to replace the customer's payment instrument, and/or proactively inquire about the customer's experience with the functionality of one or more of the payment interfaces of the payment instrument.

In response to an output that a payment instrument interface is malfunctioning, in some embodiments, the model may initiate a reissuance of the payment instrument. In further embodiments, the model may initiate a request for reissuance of the payment instrument, cause a request to be sent for input from the customer about the operation of the payment instrument, or cause a request to be sent for input from the customer about the reissuance of the payment instrument.

Note that logic circuitry refers to circuitry that implements logic with discrete components and/or integrated circuits; circuitry with processing capabilities to perform logic at least partially in the form of code along with the code; circuitry with buffers, other storage media, and/or other storage capabilities to store code along with the code; and/or a combination thereof.

Many embodiments pretrain the model with multiple sets of transactions, each set including transaction data for a sequence or time series of transactions by a customer. In several embodiments, the model is initially pretrained with sets of transactions from multiple customers to train the model about common sequences of transactions that may represent common behavioral patterns. Some embodiments select different sets of transactions from the multiple customers to train the model with transaction sequences that have different counts of transactions that may begin, e.g., at different times, advantageously increasing the robustness of the model's ability to recognize transactions that correspond to behavioral patterns. Some embodiments randomly select transactions to generate a time series of transactions with which to train the model to increase robustness of the training. And some embodiments introduce fuzziness to the values such as transaction values, geo-location values, time values, other factors implemented as inputs for the model, and the like, to increase the robustness of the training for the model. Introduction of fuzziness to a value in transaction data refers to a modification of a value in the transaction data where the modification typically changes the value by less than an order of magnitude.

In some embodiments, one or more instances of the model may monitor transactions of a customer within a window of time, or a time frame, such as several weeks, to identify a malfunctioning payment instrument interface within that time frame. In several embodiments, the time frame may be adjusted or tuned over time based on detection of a malfunctioning payment instrument interface, based on customer feedback, and/or based on other factors. In other embodiments, rather than defining a time frame, the model may monitor a particular count of or a number of transactions within a time series of a customer. In several embodiments, the time series of transactions may include selected transactions such as only periodic transactions that occur, e.g., on a daily basis, every other day, every few days, once a week, and/or the like for a particular customer. For example, the time series of transactions may include "Card present" transactions and may also be limited to transactions that, e.g., occur periodically; during certain days of the week such as during a week day; during certain times of the day such as prior to work hours, during lunch time frame, or after work hours; and/or the like. In some embodiments, the transactions may only include repetitive transactions for which a customer typically uses the same payment instrument interface.

In other embodiments, after pretraining with transaction data from multiple customers or all customers, the model may be trained, or retrained, with sets of transactions from a specific customer to train the model with behavioral patterns of the specific customer and/or to train the model to detect patterns of transactions that lead to a request for reissuance of a payment instrument. Similar to the pretraining with the sets of transactions from multiple customers, the pretraining with sets of transactions from the specific customer's purchase history may include transaction sequences that have different counts of transactions, one or more synthesized time series of randomly selected transactions, and fuzzy values from the customer's purchase history. Fuzzy values refer to values in transaction data that are modified so the values do not reflect the actual purchase information. Such changes to the values in transaction data typically do not exceed an order of magnitude. In several embodiments, a model is pretrained for each customer, so each customer advantageously has a model, specifically adapted to the purchasing habits of that specific customer, to monitor that specific customer's transactions for deviations that are indicative of a malfunctioning payment interface.

Once the model launches and begins to monitor the transactions for the specific customer, the model may, in many embodiments, may collect new, transaction data as new training data. In other words, once the malfunction detection logic circuitry confirms or verifies that a transaction is matches a behavioral pattern of the customer and/or is indicative of a payment instrument interface malfunctioning, the malfunction detection logic circuitry may train the model with the new transaction data, advantageously, teaching the model the contemporaneous purchasing habits of the specific customer to continuously improve the model's ability to determine a probability that one or more of the payment interfaces of the customer's payment instrument is malfunctioning.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

Figure 1C:
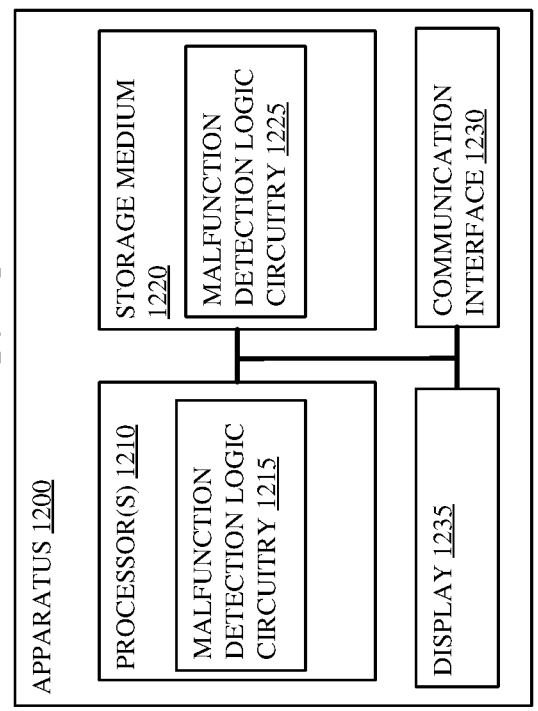
FIG. 1C depicts an embodiment of an apparatus such as a server or other computer to detect malfunctioning payment interfaces of payment instruments.
Figure 1A:
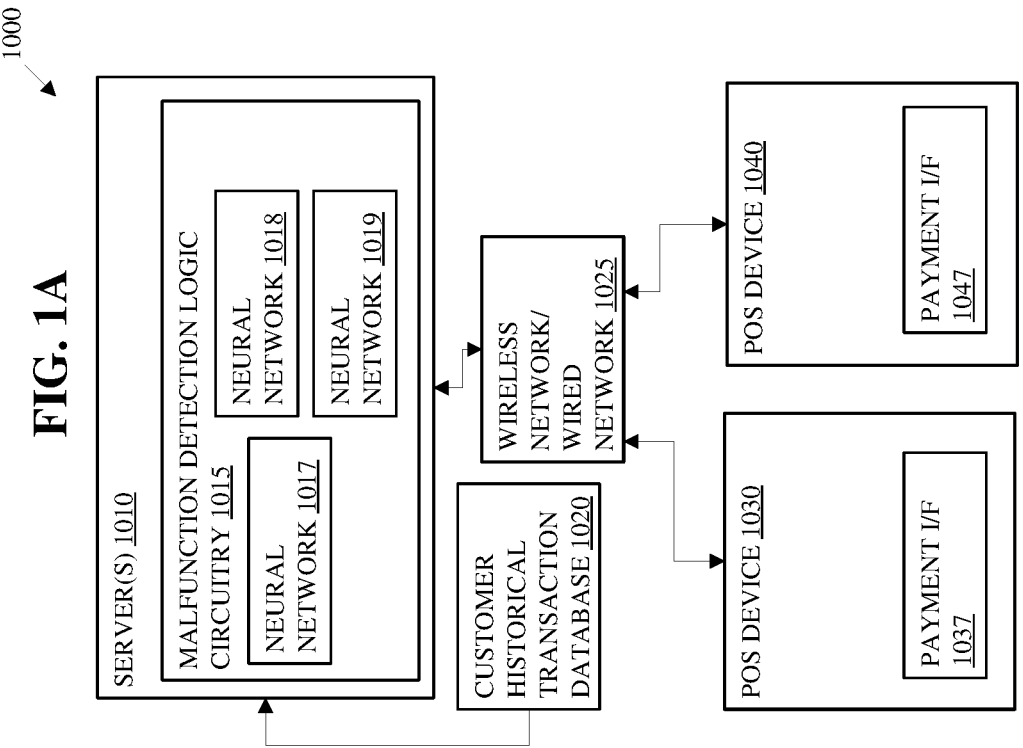
FIGS. 1A depicts an embodiment of a system including servers, networks, and point-of-sale terminals to detect malfunctioning payment interfaces of payment instruments.

Turning now to the drawings, FIGS. 1A-C depict embodiments of systems including servers, networks, point-of-sale (POS) terminals, and payment instruments to detect a malfunctioning payment interface of a payment instrument with multiple payment interfaces. FIG. 1A illustrates an embodiment of a system 1000. The system 1000 may represent a portion of at least one wireless or wired network 1025 that interconnects server(s) 1010 with POS devices 1030 and 1040. The at least one wireless or wired network 1025 may represent any type of network or communications medium that can interconnect the server(s) 1010 and the POS devices 1030 and 1040, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services. For example, a first set of one or more server(s) 1010 may provide services that includes pretraining a model such as a neural network 1017 of a malfunction detection logic circuitry 1015 with transaction data from more than one customer. The first set of server(s) 1010 may comprise anonymized transaction data that, in many embodiments, comprise behavioral patterns, or transaction patterns, of multiple customers including behavioral patterns indicative of a malfunctioning payment interface and/or indicative of functioning payment interfaces. In some embodiments, the transaction data is not anonymized but the neural network 1017 may not require transaction data that would identify a particular customer.

In other embodiments, the model may be a mathematical model rather than a neural network. The mathematical model may comprise machine learning algorithms to learn behavioral patterns of customers that are indicative of a malfunctioning payment interface and/or behavioral patterns that are not indicative of a malfunctioning payment interface. In further embodiments, the mathematical model may comprise stochastic processes that include statistical algorithms to determine a probability based on a time series of transactions.

The first set of server(s) 1010 may pretrain the neural network 1017 to cluster, classify, and/or predict transactions to determine a probability that a payment interface of a payment instrument is malfunctioning. The pretraining may involve training the neural network 1017 with sets of transactions from multiple customers. The sets of transaction data may be split into sets of training data and sets of testing data. The model can train with the sets of training data and then tests can run on the model with the sets of testing data to determine the accuracy of the probabilities output by the neural network 1017.

Each set of transaction data represented in the training data and testing data may comprise a sequence of transactions that occur in a series such as a time series or time sequence. Furthermore, some embodiments may selectively include transactions for training by removing or otherwise not including other transactions in a time series. Many embodiments, for example, include only "Card Present" transactions since the "Card Present" transactions include transactions for which a physical payment instrument performs the transaction. For example, POS devices 1030 and 1040 may represent terminals that two different retailers use to process transactions with payment instruments such as credit cards. POS device 1030 may represent a POS terminal at a gas pump of a gas station and the payment interface 1037 may be a payment interface of the POS terminal 1030. The payment interface 1037 may represent one or more payment interfaces such as a tap interface, a chip interface, and/or a magnetic stripe interface for processing transactions. To perform a transaction with the tap interface, chip interface, or magnetic stripe interface, the payment instrument is physically presented to the payment interface 1037 and, thus, the transaction is considered a "Card Present" transaction. Similarly, the POS device 1040 may comprise a payment interface 1047 to perform "Card Present" transactions for a grocery store and may require a payment instrument to be physically present to perform a transaction.

In further embodiments, the training data and testing data may only include transactions within a period of time prior to a request for reissuance of the customer's payment instrument. Such embodiments may include a setting or a heuristic or machine learning algorithm to select the time frame. Other embodiments may randomly or pseudo-randomly select the time frame within predefined parameters such as randomly or pseudo-randomly selecting a time frame that is a minimum of one day and a maximum of two months. In some embodiments, the time frame may be between a minimum of multiple days, such as 2 days, 5 days, or 10 days, and a maximum of multiple days, such as 21 days, 45 days, or 90 days.

Some embodiments may selectively train and test the neural network 1017 with transaction data that conveys a repetitive behavioral pattern (or transaction pattern). For instance, customers may purchase gasoline for a vehicle periodically (e.g. once a week) and may always or predominantly perform the transaction to purchase the gasoline with the tap of a payment instrument. Similarly, the customers may typically purchase lunch (e.g., three to four times a week) with the magnetic stripe of the payment instrument and the customers may purchase groceries (e.g., once a week) with the chip of the payment instrument. Thus, the neural network 1017 can train with such transactions so the neural network 1017 can output a probability of a malfunction of a payment interface of a customer's payment instrument based on a deviation from typical transaction pattern for, e.g., Card Present transactions. For example, if the customer typically purchases groceries once a week with the chip interface of the payment instrument, this pattern may be apparent in the historical transaction data for the customer over many months with only minor deviations when that customer is on vacation or on a business trip. Thus, the neural network 1017 can learn the repetitive or periodic behavior with respect to conducting transactions at the grocery store. Thereafter, if the transaction data includes one or more fallback indicators that indicate fallback transactions and possibly one or more declination indicators to indicate declines due to a failure to authorize transactions via the chip interface, the neural network 1017 can compare this change in the transaction data to the repetitive pattern from the customer's historical transaction data to determine a high probability that the chip interface of the payment instrument is malfunctioning. Furthermore, if the transaction data exhibits a decrease in the frequency of use of the payment instrument in conjunction with one or more fallback indicators and/or one or more declination indicators, the model may determine a high probability that the chip interface of the payment instrument is malfunctioning. Still further, if the transaction data exhibits a sudden and/or significant decrease in the frequency of use of the payment instrument, the model may determine a high probability that the chip interface of the payment instrument is malfunctioning. Significant may comprise, for instance, 10 percent or more decrease in the use of the payment instrument. In many embodiments, the actual percentage may be based on learned behavioral patterns based on training of the model with transaction data from multiple customers.

In some situations, the customer may switch to a different payment instrument, so the transaction data may exhibit a repetitive pattern of grocery store purchases with the chip interface followed by fallback indicators and/or declination indicators relating to a failure to authorize transactions via a chip interface, followed by an absence in chip interface transactions at the grocery store. The greater the deviation that the neural network 1017 computes based on training to learn typical behavioral patterns, the larger the probability output by the neural network 1017.

Further embodiments may also train with training data that combines sets of transactions that exhibit typical behavioral patterns with sets of transactions associated with a payment interface malfunction. In other words, the neural network 1017 may train with the repetitive transaction patterns of the customers and also with transaction patterns related to a failure or malfunction of the payment interface. Still other embodiments may only train the neural network 1017 with behavioral patterns, or spending behavior, associated with a payment interface malfunction.

After pretraining, the neural network 1017 with the transaction data from multiple customers, the first set of the server(s) 1010 or a second set of one or more server(s) 1010 may execute one or more instances of the neural network 1017 such as the neural networks 1018 and 1019 to periodically monitor transactions of customers in parallel over a time frame or for a certain count of transactions. For example, the malfunction detection logic circuitry 1015 may receive transaction data for a recent transaction conducted by a customer, retrieve or otherwise receive historical transaction data from a customer historical transaction database 1020 for the customer, and input the transaction data and the historical transaction data at the input layer of the neural network 1017. The customer historical transaction database 1020 may be a database established to include selected transaction data from each of the customers or may comprise a database of all recorded transaction data for multiple customers. In some embodiments, the customer historical transaction database 1020 is a distinct storage system from the server(s) 1010 and, in other embodiments, the customer historical transaction database 1020 is part of the server(s) 1010.

The neural network 1017 may, based on training of the neural network 1017, determine and output a probability that the transaction data and historical transaction data includes usage of payment interfaces of a payment instrument that is indicative of one or more malfunctioning payment interfaces. For example, the customer exhibits a behavioral pattern in which the customer purchases gas once a week with the tap interface of the payment instrument. The neural network 1017 may receive, as input tensors, the transaction data that includes an indication of a fallback mode from the tap interface to the chip interface, and thereafter in the time series, no further purchases gasoline over several weeks with the payment instrument. In such embodiments, the neural network 1017 may calculate a probability that the tap interface of the payment instrument malfunctioned or a probability that at least one of the payment interfaces malfunctioned based on the deviation by the customer from behavioral patterns of the customer or of multiple customers as learned from pretraining.

In other embodiments, after pretraining the neural network 1017 with the transaction data from multiple customers, the first set of the server(s) 1010 or a second set of one or more server(s) 1010 may continue to train or retrain one or more instances of the neural network 1017 with purchase history of one or more specific customers. For example, some embodiments fully train the neural network 1017 with the transaction data from multiple customers prior to training an instance of the neural network 1017 with purchase history of a specific customer. Some embodiments fully train the neural network 1017 with the transaction data from multiple customers prior to training an instance of the neural network 1017 with purchase history of a subset of customers that exhibit similar behavioral patterns while the payment instrument is not malfunctioning. Other embodiments may not fully train the neural network 1017 prior to provision of an instance to train with purchase history of a specific customer or a subset of customers. Note that fully training a neural network such as the neural network 1017 may involve training the neural network 1017 with sufficient samples of training data for the neural network 1017 to converge on solutions for, e.g., multiple predicted transactions or multiple classifications based on different initial conditions or initial states of the neural network 1017.

The neural networks 1018 and 1019, in such embodiments, may represent instances of the neural network 1017 retrained for specific customers or a subset of customers that exhibit similar behavioral patterns while the payment instrument is not malfunctioning. In such embodiments, rather than providing, as input to the neural network 1018, historical transaction data for the specific customer along with transaction data for a recent transaction, the neural network 1018 may be designated for the specific customer and may only receive, as input, transaction data for that specific customer as the customer conducts transactions.

In several embodiments, one or more the server(s) 1010 may perform malfunction detection with the neural networks 1018 and 1019. For example, when a first customer completes a transaction such as purchasing gas, the malfunction detection logic circuitry 1015 may apply transaction data that describes the purchase as a tensor to the input layer of the neural network 1018. The neural network 1018 may operate in inference mode and output an indication of an error or probability associated with the purchase. The probability may represent a difference between the purchase of the gas and a predicted range of transactions that the neural network 1018 determines based on the pretraining and/or the continued training with new transactions for this customer. If the customer buys the gas at the same gas station for about the same amount, at about the same time, on about the same day of the week that the customer normally purchases gas for a vehicle with the same payment interface such as the tap interface, the probability output from the neural network 1018 will likely be very small if not nil. On the other hand, if one or more of these factors deviate significantly from behavioral patterns in the customer's purchase history and/or from the sequences of transactions learned from training on transaction data from multiple customers, the probability output from the neural network 1018 may be large. In many embodiments, the purchase history may exhibit behavioral patterns of customer such as the payment interface that customers typically use to conduct various types of transactions and typical time periods between purchases of various goods or services.

Preferences by a company associated with the transactions, a company associated with the server(s) 1010 (if different), and/or the customer associated with the neural network 1018 may establish or factor into a determination of a probability threshold. The malfunction detection logic circuitry 1015 may compare the probability threshold to the error or probability output by the neural network 1018 in response to the purchase to determine if proactive action should occur in response to the probability output. For example, in response to a probability output that reaches or exceeds a probability threshold, the malfunction detection logic circuitry 1015 may determine that one or more of the payment interfaces of the customer's payment instrument has failed or otherwise malfunctioned and, in response, issue, e.g., a request for a new payment instrument for the customer, a request for the customer to provide input about the functionality of the payment instrument, and/or a request to ask the customer if the customer wants a new payment instrument issued.

In many embodiments, the malfunction detection logic circuitry 1015 may continue to collect training data and train the neural network 1017 and instances of the neural network 1017 based on customer transactions from multiple customers. In other embodiments, the malfunction detection logic circuitry 1015 may continue to collect training data and train the neural network 1017 and instances of the neural network 1017 based on customer transactions of specific customers.

FIG. 1B depicts an embodiment for a payment instrument 1100 such as a credit card with multiple payment interfaces to conduct transactions with POS terminals such as the POS devices 1030 and 1040 shown in FIG. 1A. The payment instrument 1100 may be plastic, metal, or other material. In the present embodiment, the payment instrument 1100 comprises an antenna 1110 coupled with a wireless communication interface 1120, a legacy magnetic stripe 1130 coupled with the wireless communication interface 1120, a chip coupled with the wireless communication interface 1120, and a magnetic stripe 1150. The antenna 1110 may comprise a conductive material that forms a loop around at least a portion of the payment instrument 1100. If the payment instrument 1100 comprises a conductive material, a non-conductive material may isolate the loop of the antenna 1110 from conductive materials in the payment instrument 1100.

The wireless communication interface 1120, or contactless interface, may comprise a near-field communications interface and may also be referred to as the tap interface. The wireless communication interface 1120 may be a passive device that draws power from a transmitter to activate, receive a transmission, and transmit a response. In other embodiments, the wireless communication interface 1120 may comprise a battery-powered, active interface or a battery-assisted, passive interface.

The legacy magnetic stripe 1130 may comprise a radio frequency identification (RFID) tag. The tag may comprise an integrated circuit coupled with the wireless communication interface 1120 and the antenna 1110 to respond to a transmitter of a POS terminal, such as the POS device 1030 shown in FIG. 1A, with information such as the information stored on the magnetic stripe 1150. In some embodiments, the legacy magnetic stripe 1130 includes security protocols such as short transmission ranges, rolling codes, challenge-response authentication, and/or cryptographically coded responses.

The legacy magnetic stripe 1130 may couple with the wireless communication interface 1120 to conduct a transaction via a contactless interface, or tap interface, of the payment instrument 1100. In some embodiments, the legacy magnetic stripe 1130 may comprise the only device to conduct transactions through a tap interface of the payment instrument 1100. In other embodiments, the legacy magnetic stripe 1130 may comprise one of multiple devices that can conduct transactions through the tap interface of the payment instrument 1100.

The chip 1140 may comprise a microchip, other processor, and/or integrated circuit including memory. In some embodiments, the chip 1140 may comprise contacts and may be a contacted interface for the payment instrument 1100 that is often referred to as the chip interface. In further embodiments, the chip 1140 may couple with the wireless communication interface and comprise a contactless interface, or tap interface, of the payment instrument 1100. In some embodiment, the chip 1140, wireless communication interface 1120, and antenna 1110 form the only tap interface for the payment instrument 1100. In other embodiments, the chip 1140 may comprise part of one of the tap interfaces for the payment instrument 1100.

Some embodiments of the payment instrument 1100 may have two payment interfaces such as a combination of the chip 1140 as a contacted interface and the magnetic stripe 1150 as a contacted interface. Other embodiments may comprise three payment interfaces such as a combination of the chip 1140 as a contacted interface, the magnetic stripe 1150 as a contacted interface, and the legacy magnetic stripe 1130 as a contactless interface. Further embodiments may have any number of payment interfaces such as the payment interfaces discussed herein or other payment interfaces.

FIG. 1C depicts an embodiment for an apparatus 1200 such as one of the server(s) 1010 shown in FIG. 1A. The apparatus 1200 may be a computer in the form of a smart phone, a tablet, a notebook, a desktop computer, a workstation, or a server. The apparatus 1200 can combine with any suitable embodiment of the systems, devices, and methods disclosed herein. The apparatus 1200 can include processor(s) 1210, a non-transitory storage medium 1220, communication interface 1230, and a display 1235. The processor(s) 1210 may comprise one or more processors, such as a programmable processor (e.g., a central processing unit (CPU)). The processor(s) 1210 may comprise processing circuitry to implement malfunction detection logic circuitry 1215 such as the malfunction detection logic circuitry 1015, 1018, or 1019 in FIG. 1A.

The processor(s) 1210 may operatively couple with a non-transitory storage medium 1220. The non-transitory storage medium 1220 may store logic, code, and/or program instructions executable by the processor(s) 1210 for performing one or more instructions including the malfunction detection logic circuitry 1225. The non-transitory storage medium 1220 may comprise one or more memory units (e.g., removable media or external storage such as a secure digital (SD) card, random-access memory (RAM), a flash drive, a hard drive, and/or the like). The memory units of the non-transitory storage medium 1220 can store logic, code and/or program instructions executable by the processor(s) 1210 to perform any suitable embodiment of the methods described herein. For example, the processor(s) 1210 may execute instructions such as instructions of malfunction detection logic circuitry 1225 causing one or more processors of the processor(s) 1210 represented by the malfunction detection logic circuitry 1215 to perform an inference computation, by a neural network of the malfunction detection logic circuitry 1215 based on transaction data. The inference computation may determine a probability that a behavioral pattern exhibited by transactions of a customer indicate a malfunction of one or more payment interfaces of the customer's payment instrument. The neural network may determine the probability based on pretraining of the neural network to cluster, predict, or classify a set of transactions conducted by the customer. The pretraining of the neural network to predict malfunctions of payment interfaces of a customer's payment instrument may be based on a purchase history of multiple customers.

Once the neural network determines the processes a series of transactions for a customer and determines a probability based on a deviation from a typical behavioral pattern of customers and/or a behavioral pattern associated with a request by a customer to reissue a payment instrument, the malfunction detection logic circuitry 1215 may determine whether the probability exceeds a probability threshold. The probability threshold may represent a threshold chosen, calculated, or otherwise determined to indicate a deviation from a behavioral pattern that indicates that a payment interface of the customer's payment instrument is likely malfunctioning. In response to a determination that a payment interface is malfunctioning, the malfunction detection logic circuitry 1215 may cause communication of a request to reissue a payment instrument to the customer, cause communication of an inquiry to the customer, cause a message to display on a display 1235, and/or the like.

The processor(s) 1210 may couple to a communication interface 1230 to transmit and/or receive data from one or more external devices (e.g., a terminal, display device, a smart phone, a tablet, a server, or other remote device). The communication interface 1230 includes circuitry to transmit and receive communications through a wired and/or wireless communication medium such as an Ethernet interface, a wireless fidelity (Wi-Fi) interface, a cellular data interface, and/or the like. In some embodiments, the communication interface 1230 may implement logic such as code in a baseband processor to interact with a physical layer device to transmit and receive wireless communications such as transaction data from a server or a data storage system. For example, the communication interface 1230 may implement one or more of local area networks (LAN), wide area networks (WAN), infrared, radio, Wi-Fi, point-to-point (P2P) networks, telecommunication networks, cloud communication, and the like.

The processor(s) 1210 may couple to a display 1235 to display a message or notification via, graphics, video, text, and/or the like. In some embodiments, the display 1235 may comprise a display on a terminal, a display device, a smart phone, a tablet, a server, or a remote device.

Figure 1D:
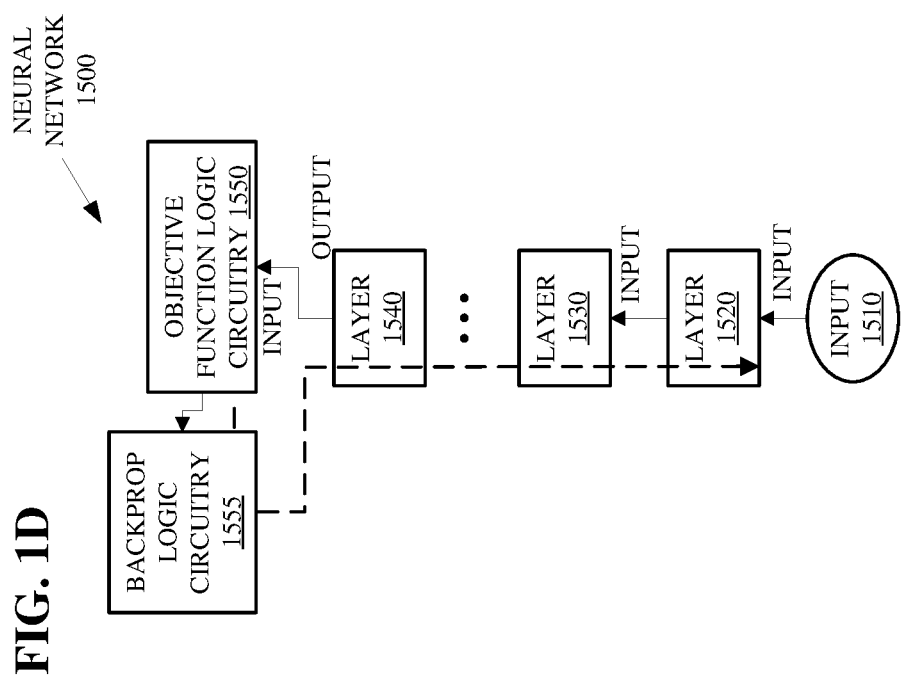
FIG. 1D depicts an embodiment of a neural network of a malfunction detection logic circuitry, such as malfunction detection logic circuitry illustrated in FIGS. 1A, 1C, and 2.

FIG. 1D depicts an embodiment of a neural network 1500 of a malfunction detection logic circuitry, such as malfunction detection logic circuitry 1015 illustrated in FIG. 1A and the malfunction detection logic circuitry 1215 and 1225 illustrated in FIG. 1B. FIG. 1D depicts an embodiment of stages of the neural network (NN) 1500 such as a recurrent neural network (RNN).

An RNN is a class of artificial neural network where connections between nodes form a directed graph along a sequence. This allows the RNN to exhibit dynamic temporal behavior for a time sequence. RNNs can use their internal state (memory) to process sequences of inputs and can have a finite impulse structure or an infinite impulse structure. A finite impulse recurrent network is a directed acyclic graph that can be unrolled and replaced with a strictly feedforward neural network, while an infinite impulse recurrent network is a directed cyclic graph that cannot be unrolled. A feedforward neural network is a neural network in which the output of each layer is the input of a subsequent layer in the neural network rather than having a recursive loop at each layer.

The neural network 1500 illustrates an embodiment of a feedforward neural network, but other embodiments may comprise other RNNs or other types of NNs. The neural network 1500 comprises an input layer 1510, and three or more layers 1520 and 1530 through 1540. The input layer 1510 may comprise input data that is training data for the neural network 1500 or new transaction data to evaluate. The input layer 1510 may provide the transaction data in the form of tensor data to the layer 1520. The transaction data may comprise transaction information, which is data related to a purchase by a customer. The transaction data may include information indicating whether the transaction is a "Card Present" transaction or a "Card Not Present" transaction, location information, value information, transaction type information, time information, and/or the like. For instance, the location information may include coordinates, a distance from an address associated with a customer, an address, a city, a state, a zip code, a map quadrant, and/or the like. The value information may include a purchase price, a value on hold, a sub-total, a tax, and/or the like. The transaction type information may include an indication of a general type and/or subtype of purchase such as a retail purchase, a gas purchase, a vehicle maintenance fee, a travel expense, a tax, a government fee, and/or the like. And the time information may include a time, a day, a month, a year, a season, a quarter, and/or the like.

In many embodiments, the input layer 1510 is not modified by backpropagation. The layer 1520 may compute an output and pass the output to the layer 1530. Layer 1530 may determine an output based on the input from layer 1520 and pass the output to the next layer and so on until the layer 1540 receives the output of the second to last layer in the neural network 1500. For embodiments with RNNs that are not feedforward (not shown), each layer may recursively compute an output based on the output of the layer being fed back into the same layer as an input.

The layer 1540 may generate an output and pass the output to an objective function logic circuitry 1550. The objective function logic circuitry 1550 may determine errors in the output from the layer 1540 based on an objective function such as a comparison of the expected output against the actual output. For instance, the expected output may be paired with the input in the training data supplied for the neural network 1500 for supervised training. In the present embodiment, during training, the probability output of the objective function logic circuitry 1550 should be less than a probability threshold if the training data is known, selected, or synthesized to represent typical behavioral patterns of customers using one or more payment interfaces of a payment instrument. On the other hand, for training data known, selected, or synthesized to represent behavioral patterns indicative of customer's using or discontinuing use of a payment instrument with a malfunctioning payment interface, the probability output of the objective function logic circuitry 1550 should be greater than a probability threshold. When operating in inference mode, the malfunction detection logic circuitry, such as the malfunction detection logic circuitry 1215 shown in FIG. 1C, may compare the output of the objective function logic circuitry 1550 against the probability threshold to determine if the probability indicates a malfunctioning payment interface.

During the training mode, the objective function logic circuitry 1550 may output errors to backpropagation logic circuitry 1555 to backpropagate the errors through the neural network 1500. For instance, the objective function logic circuitry 1550 may output the errors in the form of a gradient of the objective function with respect to the parameters of the neural network 1500.

The backpropagation logic circuitry 1555 may propagate the gradient of the objective function from the top-most layer, layer 1540, to the bottom-most layer, layer 1520 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives of f and g. After the objective function logic circuitry 1550 computes the errors, backpropagation logic circuitry 1555 backpropagates the errors. The backpropagation is illustrated with the dashed arrows.

Figure 2:
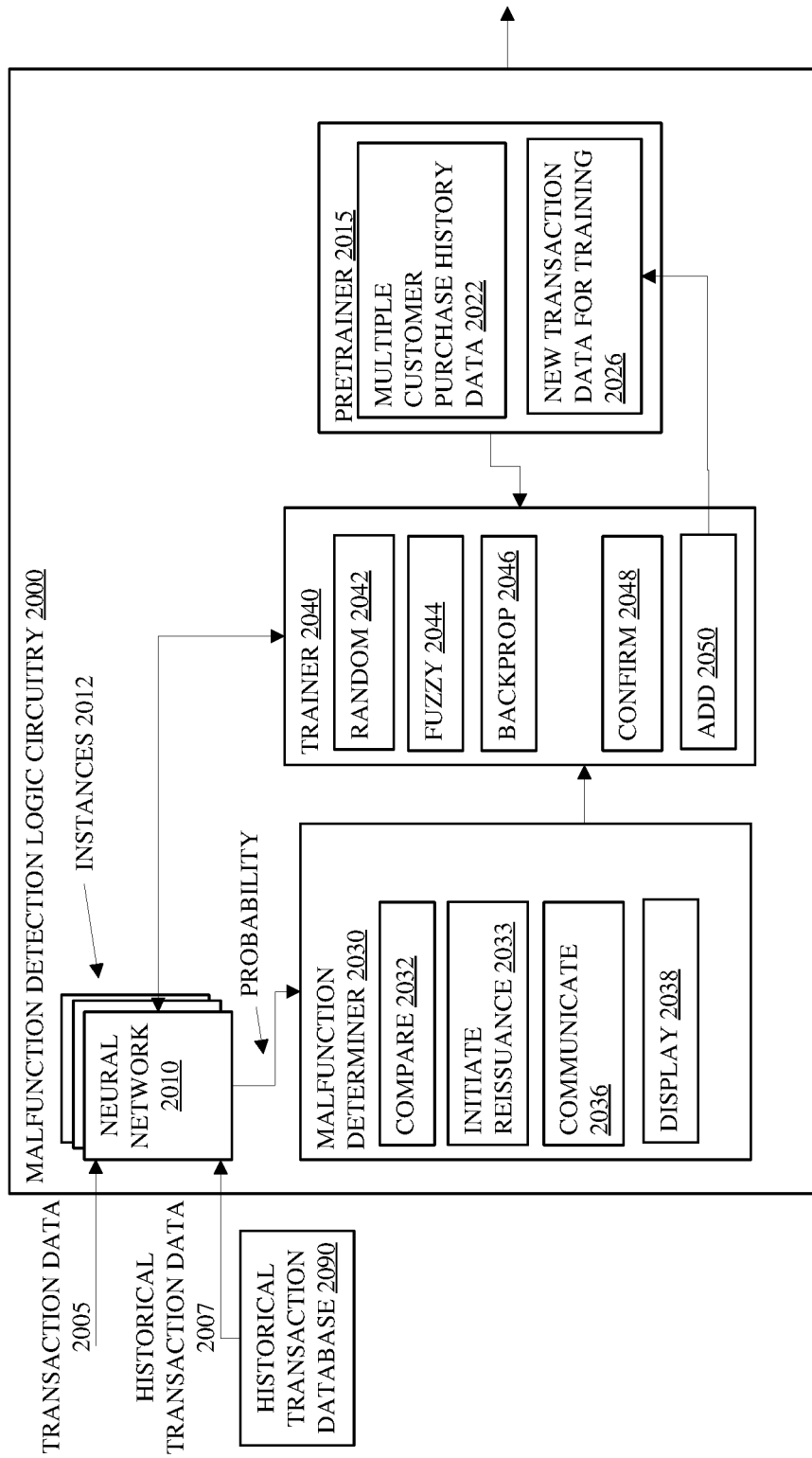
FIG. 2 depicts an embodiment of malfunction detection logic circuitry, such as the malfunction detection logic circuitry shown in FIGS. 1A, 1C, and 2.

FIG. 2 depicts an embodiment of a malfunction detection logic circuitry 2000 such as the malfunction detection logic circuitry 1015 in FIG. 1A. The malfunction detection logic circuitry 2000 may perform one or more operations to train a neural network 2010, such as the neural network 1500 illustrated in FIG. 1D, to determine a probability that a payment interface of a customer's payment instrument is malfunctioning. In other embodiments, a mathematical model may be implemented instead of a neural network.

The malfunction detection logic circuitry 2000 may comprise logic circuitry such as the neural network 2010, a pretrainer 2015, a malfunction determiner 2030, and a trainer 2040. The neural network 2010 may comprise one or more recurrent neural networks, a gradient boosting engine, a logistic regression algorithm or analysis model, and/or the like, to determine a probability that transaction data of a series of transactions for a customer indicates that the customer's payment instrument has a malfunctioning payment interface. In many embodiments, the neural network 2010 may determine a probability based on pretraining with sets of transactions from purchase histories of multiple customers. The neural network 2010 may output a probability or error to the malfunction determiner 2030 in response to an input of transaction data 2005 from a customer and historical transaction data 2007 for that customer from a historical transaction database 2090, or an input of training data or testing data from the pretrainer 2015.

Prior to operation in inference mode, the malfunction detection logic circuitry 2000 may operate the neural network 2010 in training mode and train the neural network 2010 with training data from the pretrainer 2015. The pretrainer 2015 may include multiple customer purchase history data 2022 and new transaction data for training 2026. The multiple customer purchase history data 2022 may include transaction data from multiple customers. In some embodiments, the multiple customer purchase history data 2022 is anonymized and/or at least a portion of the data is encrypted. The anonymized data may include transaction data that does not have data to identify a customer and may even have modified transaction data that does not accurately describe the transactions by the customer but does represent the transactions closely enough for training the neural network 2010.

In many embodiments, the malfunction detection logic circuitry 2000 may first pretrain the neural network 2010 with the multiple customer purchase history data 2022. In other embodiments, the malfunction detection logic circuitry 2000 may pretrain the neural network 2010 with synthesized transaction data.

The trainer 2040 may repeatedly select sets of transaction data from the multiple customer purchase history data 2022 for training. Each set may include a sequence or time series of transaction data from, e.g., a randomly selected customer or a customer selected based on a behavioral pattern exhibited in the customer's transaction history. For instance, a customer's transaction data may be selected based on the inclusion of one or more requests by the customer for reissuance of the payment instrument. In some embodiments, the customer's transaction data may be selected based on typical behavioral patterns exhibited in the customer's transaction data. Furthermore, the sets may have different counts or numbers of transactions to, advantageously, increase the robustness of the training.

The trainer 2040 comprises logic circuitry may improve the training by occasionally or periodically modifying the transaction data from the pretrainer 2015. In the present embodiment, the trainer 2040 comprises random 2042 and fuzzy 2044. The random 2042 logic circuitry may form random sets of transactions from the multiple customer purchase history data 2022. For example, the random 2042 logic circuitry may randomly choose transactions from different customers to form a set of transactions as a sequence or time series. In some embodiments, the random selection of transactions may be limited by one or more rules such as a rule the prevents purchases within a short or unrealistic period of time, purchases within a specified time period, or multiple purchases of certain types within a specified time period. For instance, if a first purchase in a series is 20 miles from a second purchase and both are 'Card Present' purchases, a rule for the random logic may prevent the random selection of such purchases within a short or unrealistic period of time such as one minute. Note that the short or unrealistic period of time is defined in the context of the distance between the locations of the purchases.

The trainer 2040 may also comprise fuzzy 2044 logic circuitry. The fuzzy 2044 logic circuitry may modify values of the transaction data from the pretrainer 2015. For instance, the fuzzy 2044 logic circuitry may make small changes to locations of purchases such as moving the location across the street, values of transactions such as increasing or decreasing the value by 10% to 20%, modifying the time of the transaction, modifying the day of the transaction, and/or the like. Slight modifications to values of transaction data can, advantageously, improve the robustness of the neural network 2010. In several embodiments, the fuzzy 2044 logic circuitry may modify values occasionally or periodically. For instance, some embodiments may modify one value of one percent of the transactions received from the pretrainer 2015. Other embodiments may modify multiple values in five percent of the transactions. The frequency of such modifications may depend on design parameters of the neural network 2010.

A backprop 2046 logic circuitry of the trainer 2040 may train the neural network 2010 by backward propagation of the error that is output by the neural network 2010 in response to the training data. The error may represent a difference between a probability output from the neural network 2010 and an expected probability. Backward propagation of the error may adjust weights and biases in the layers of the neural network 2010 to reduce the error. The backward propagation, often referred to as backprop or backpropagation, of the error may effectively adjust the range of, e.g., predicted transactions responsive to the transaction data that caused the neural network 2010 to output the error.

After pretraining the neural network 2010 with the multiple customer purchase history data 2022, the malfunction detection logic circuitry 2000 may create multiple instances 2012 of the neural network 2010. In some embodiments, the malfunction detection logic circuitry 2000 may create one of the instances 2012 for every customer. In other embodiments, the malfunction detection logic circuitry 2000 may create one of the instances 2012 for every customer within a group of customers that exhibit similar behavioral patterns, or transaction patterns, in use of payment interfaces for transactions. The malfunction detection logic circuitry 2000 may select the group of customers based on a list of customers provided to the malfunction detection logic circuitry 2000 and/or based on other criteria.

Once the malfunction detection logic circuitry 2000 trains the neural network 2010, an instance of the neural network 2010 can perform malfunction detection for the specific customer and, in several embodiments, continue to train with new, transactions completed by the customer and/or multiple customers. When the specific customer conducts a transaction, the vendor may transmit information related to that transaction to the payment instrument issuer. The payment instrument issuer may comprise a server to perform malfunction detection based on the instance of the neural network 2010. The malfunction detection logic circuitry 2000 receives the transaction data 2005 for a customer as an input as well as historical transaction data 2007 for that same customer from the historical transaction database 2090 such as the previous few weeks of transaction data for the customer and provides the input to the instance of the neural network 2010.

Based on the transaction data 2005 and the historical transaction data 2007, the instance of the neural network 2010 may perform malfunction detection in inference mode and output a probability to the malfunction determiner 2030. The probability may represent a likelihood that a deviation from learned behavioral patterns of transaction data represents a behavioral pattern that is indicative of a malfunctioning payment interface of the customer's payment instrument.

The malfunction determiner 2030 may determine if the probability output by the instance of the neural network 2010 indicates a malfunctioning payment interface of the customer's payment instrument. The malfunction determiner 2030 may comprise logic circuitry to compare 2032 the probability to a probability threshold, initiate reissuance 2033 of a payment instrument to a customer, communicate 2036 a message with an inquiry about functionality of one or more payment interfaces of the customer's payment instrument or about reissuance of the customer's payment instrument, and display 2038 a notification on a local or remote display.

The compare 2032 logic circuitry may compare the probability to a probability threshold to determine if the probability meets or exceeds the probability threshold. If the probability is equal to or greater than the probability threshold, the compare 2032 logic circuitry may output an indication to initiate reissuance 2033 logic circuitry, the communicate 2036 logic circuitry, and/or the display 2038 logic circuitry in response to determining that a payment interface of the customer's payment instrument is malfunctioning.

The compare 2032 logic circuitry may instruct the trainer 2040 to add 2050 the transaction data 2005 and the historical transaction data 2007 to the new transaction data for training 2026. In some embodiments, the add 2050 logic circuitry may add the transaction data 2005 and the historical transaction data 2007 to the new transaction data for training 2026 after verification of behavioral pattern in the transaction data by the confirm 2048 logic circuitry. In such cases, confirm 2048 logic circuitry may confirm, through communication with the customer or other confirmation, that a payment interface of the customer's payment instrument is likely malfunctioning. In other embodiments, the add 2050 logic circuitry may add the transaction data 2005 to the new transaction data for training 2026 upon determination that the probability exceeds the probability threshold. In still other embodiments, the add 2050 logic circuitry may add the transaction data 2005 and the historical transaction data 2007 to the new transaction data for training 2026 upon determination that the probability does not exceed the probability threshold.

Figure 3E:
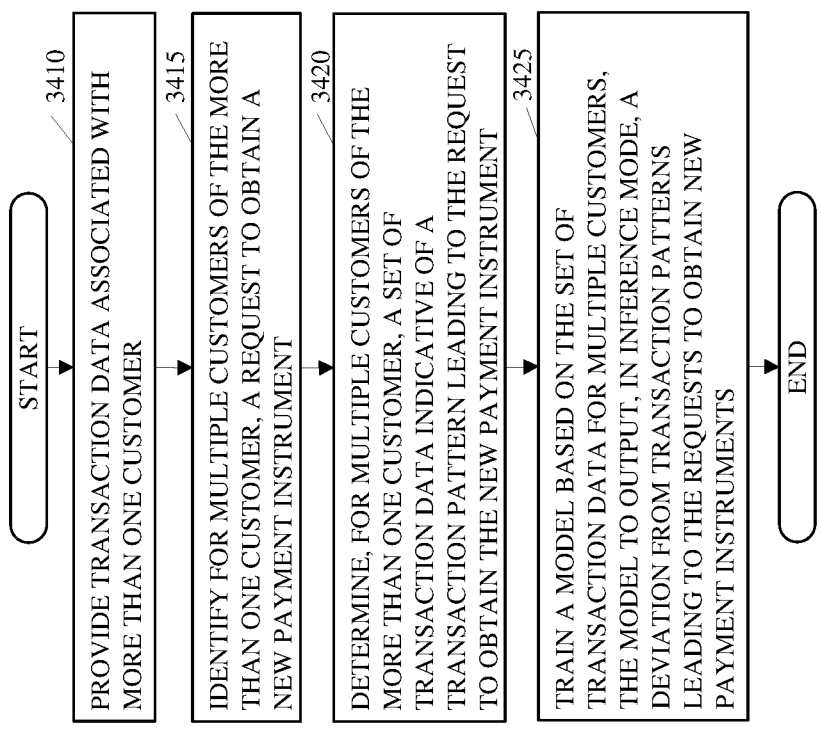

FIGS. 3A-E depict flowcharts of embodiments to pretrain a neural network, perform malfunction detection with a neural network, and communicate with a consumer, by malfunction detection logic circuitry, such as the malfunction detection logic circuitry shown in FIGS. 1A, 1C and 2. FIG. 3A illustrates a flowchart to pre-train a neural network and then continue to train the neural network. The flowchart starts with pretraining the neural network based on purchase histories of multiple customers to train the neural network to recognize patterns of transactions that represent behavioral patterns of the customers (element 3010). In other words, the malfunction detection logic circuitry may train the neural network based on multiple sets of a time series or sequence of transactions in the form of transaction data to teach the neural network sequences of transactions that exhibit common or typical behavioral patterns such as behavioral patterns illustrative of customers using various payment interfaces of a payment instrument that is operating properly and/or behavioral patterns of customers using (or ceasing use of) payment instruments when one or more of the payment interfaces on those payment instruments are malfunctioning. Such transaction data may include past card requests, declines of payment instruments or payment interfaces of payment instruments, transactions processed through different transaction modes (different payment interfaces), and/or the like. Many embodiments train the neural network on a server of the payment instrument issuer or a server by a third party to pretrain the neural network.

After pretraining the neural network based on the purchase histories of multiple customers, the flowchart may continue to train the neural network based on the purchase history of specific customers as such transaction data is added to training data sets (element 3020). In several embodiments, the malfunction detection logic circuitry may train an instance of the neural network on a server with transaction data that is captured while processing transaction data in an inference mode.

FIG. 3B illustrates a flowchart for pretraining. The flowchart begins with repeatedly training the neural network based on different counts of transactions from the purchase history of the customer to generate a range of behavioral patterns of transaction data that the neural network will recognize as typical or as representative of a malfunctioning payment interface (element 3110). In other words, the malfunction detection logic circuitry may train the neural network with multiple different sets of transactions from the purchase histories of customers and the multiple different sets will not all have the same number of transactions.

FIG. 3C illustrates a flowchart for detecting a malfunctioning payment interface. The flowchart begins with receiving transaction data for a customer, the transaction data to describe a purchase made by the customer along with historical transaction data for the customer (element 3210). In response to receiving the transaction data and the historical transaction data for the customer, the malfunction detection logic circuitry may perform an inference computation, by a neural network or mathematical model based on the transaction data. The neural network or mathematical model may determine a deviation of the set of transactions or purchases from a range of behavioral patterns learned during training to determine a probability that the customer's payment instrument has at least one malfunctioning or failing payment interface based on a purchase history of the customer (element 3215). The deviation may comprise, e.g., an error between typical behavioral patterns, or transaction patterns, and a behavioral pattern exhibited in the input transaction data. In further embodiments, the deviation may comprise, e.g., an error between behavioral patterns, or transaction patterns, indicative of a malfunctioning payment interface and a behavioral pattern exhibited in the input transaction data. The malfunction detection logic circuitry may compare the probability against a probability threshold and, if the probability exceeds the probability threshold, the malfunction detection logic circuitry may determine that the input transaction data indicates that at least one payment interface of the customer's payment is malfunctioning (element 3220).

In response to determining that at least one payment interface of the customer's payment is malfunctioning, the malfunction detection logic circuitry may determine whether to contact the customer (element 3225). For instance, the malfunction detection logic circuitry may cause a message to transmit to the customer. The message may indicate that a new payment instrument is being issued to the customer, may request information about the malfunction of payment interfaces of the payment instrument, and/or may inquire about issuance of a new payment instrument.

FIG. 3D illustrates a flowchart for causing a communication to transmit to a customer about a malfunctioning payment interface or reissuance of a new payment instrument. In response to determining that a payment interface might be malfunctioning, the malfunction detection logic circuitry may cause a communication to transmit to the customer (element 3310). For instance, the malfunction detection logic circuitry may inform the customer that a new payment instrument is being mailed to the customer, inquire about the functionality of the payment interfaces of the customer's payment instrument, and/or inquire about the customer's experience in receiving a new payment instrument.

FIG. 3E illustrates a flowchart for training a neural network to detect behavioral patterns, or transaction patterns, in transaction data associated with a customer that indicate that the customer's payment instrument might have a malfunctioning payment interface. The flowchart begins with providing transaction data associated with more than one customer (element 3410). The malfunction detection logic circuitry may have access to a database with transaction data for multiple customers over a period of time.

The malfunction detection logic circuitry may identify for multiple customers of the more than one customer, a request to obtain a new payment instrument (element 3415). The malfunction detection logic circuitry may the search for sets of transactions that lead to a request for reissuance of a payment instrument by the customer (element 3420). For instance, the malfunction detection logic circuitry may identify, e.g., five weeks of transaction data that leads to a request by the customers for reissuance of a payment instrument. The five-week period of transaction data for the customer is likely to include a behavioral pattern, or transaction pattern, that exhibits a behavior, in terms of conducting transactions, of the customer while a payment interface of the customer's payment instrument malfunctions.

After identifying a set of transaction data indicative of a transaction pattern leading to the request to obtain the new payment instrument, the malfunction logic circuitry may train a model based on the set of transaction data for the multiple customers. The malfunction logic circuitry may train the model to output, in inference mode, a probability based on a deviation from transaction patterns that lead to the requests to obtain new payment instruments (element 3425). Training with the sets of transactions exhibiting a transaction pattern, or behavioral pattern, indicative of a malfunctioning payment interface allows the model to learn a large number of such behavioral patterns, With the large number of behavioral patterns, the model can determine a probability that input transaction data, while in inference mode, exhibits a behavioral pattern of a malfunctioning payment interface by determining a deviation of the behavioral pattern from the learned behavioral patterns.

Figure 4:
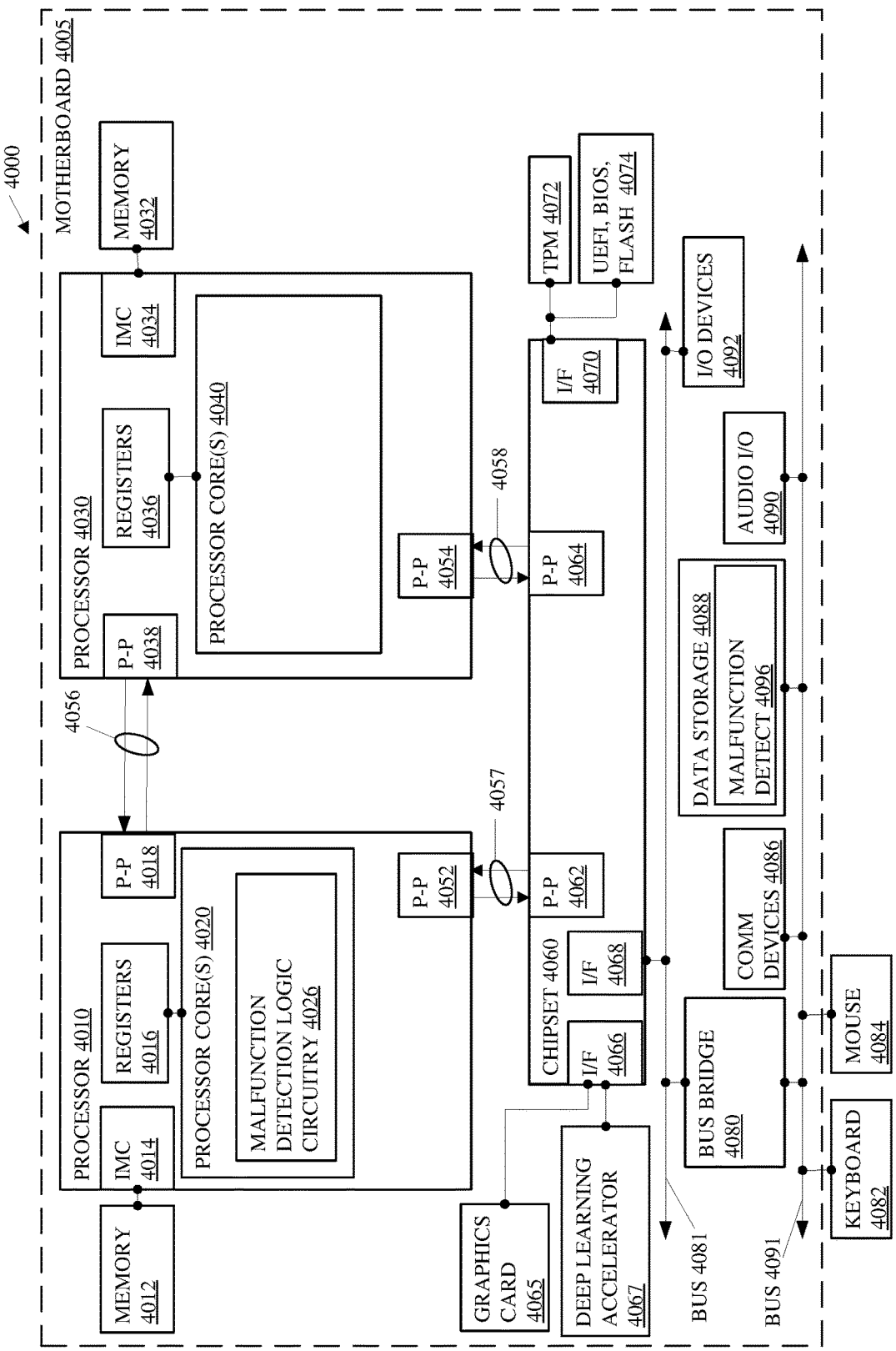
FIG. 4 depicts an embodiment of a system including a multiple-processor platform, a chipset, buses, and accessories such as the server shown in FIGS. 1A, 1C, and 2.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054.

The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a malfunction detection logic circuitry 4026 such as the malfunction detection logic circuitry 1215 shown in FIG. 1B. The malfunction detection logic circuitry 4026 may represent circuitry configured to implement the functionality of malfunction detection for neural network support within the processor core(s) 4020 or may represent a combination of the circuitry within a processor and a medium to store all or part of the functionality of the malfunction detection logic circuitry 4026 in memory such as cache, the memory 4012, buffers, registers, and/or the like. In several embodiments, the functionality of the malfunction detection logic circuitry 4026 resides in whole or in part as code in a memory such as the malfunction detection logic circuitry 4096 in the data storage unit 4088 attached to the processor 4010 via a chipset 4060 such as the malfunction detection logic circuitry 1225 shown in FIG. 1C. The functionality of the malfunction detection logic circuitry 4026 may also reside in whole or in part in memory such as the memory 4012 and/or a cache of the processor. Furthermore, the functionality of the malfunction detection logic circuitry 4026 may also reside in whole or in part as circuitry within the processor 4010 and/or 4030 and may perform operations, e.g., within registers or buffers such as the registers 4016 and 4036 within the processors 4010 and 4030, respectively, or within an instruction pipeline of the processor 4010 and 4030, respectively.

In other embodiments, more than one of the processor 4010 and 4030 may comprise the functionality of the malfunction detection logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the malfunction detection logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
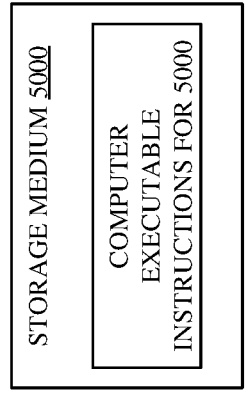
FIGS. 5-6 depict embodiments of a storage medium and a computing platform such as the server and the point-of-sale devices shown in FIGS. 1A-B.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
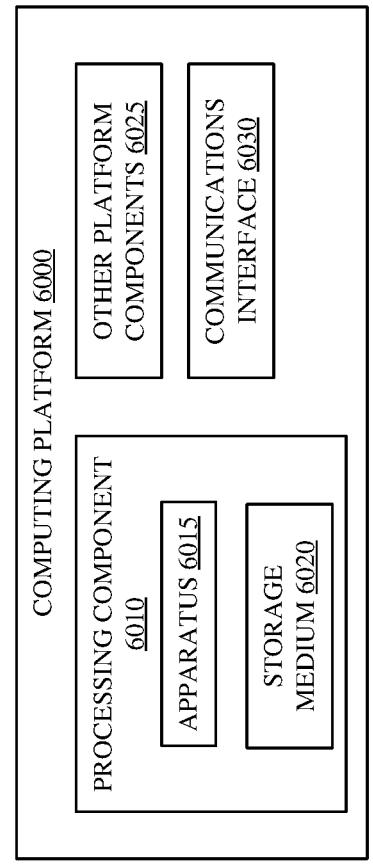

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the malfunction detection logic circuitry 1015 and 1215 illustrated in FIGS. 1A and 1C. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. An apparatus comprising:
    memory; and
    logic circuitry coupled with the memory, the logic circuitry comprising a model and a malfunction determiner, the logic circuitry to
        receive, at the logic circuitry, transaction data about at least one transaction performed via a payment instrument associated with a customer, the transaction data to indicate a payment interface of the payment instrument through which the customer conducted the at least one transaction, the payment instrument comprising one or more payment interfaces;
        determine, by the model, based on the transaction data, a probability of a malfunction by at least one interface of the one or more payment interfaces, wherein the model is trained by the logic circuitry based on a pattern of transactions associated with malfunctioning payment instruments;
        compare, by the malfunction determiner, the probability of the malfunction against a threshold; and
        determine, by the malfunction determiner, whether the at least one interface is malfunctioning based comparison of the probability of the malfunction against the threshold.

2. The apparatus of claim 1, wherein the logic circuitry is configured to determine that the probability exceeds the threshold and to determine to contact the customer to send the customer a new payment instrument, request input about a malfunction of the payment instrument, offer a new payment instrument to the customer, or a combination thereof.

3. The apparatus of claim 1, wherein the transaction data about the at least one transaction comprises a date, a time, a payment interface, a fallback indicator, an authorization or declination indicator, or a combination thereof.

4. The apparatus of claim 1, wherein the one or more payment interfaces comprise a contactless interface and at least one contacted interface, wherein the at least one contacted interface comprises a magnetic stripe, a chip, or a combination of both.

5. The apparatus of claim 1, wherein the model comprises a neural network or machine learning algorithm pretrained based on transaction data from multiple customers, the transaction data associated with customer requests for new payment instruments.

6. The apparatus of claim 5, wherein the model comprises a neural network or machine learning algorithm pretrained based on transaction data from multiple customers, the transaction data including changes in transaction patterns, the changes in transaction patterns including information about transaction modes, wherein each transaction mode is associated with one of the one or more payment interfaces.

7. The apparatus of claim 1, wherein the model comprises a neural network or machine learning algorithm pretrained based on transaction data from multiple customers, the transaction data including changes in transaction patterns prior to a decrease in a frequency of use of the payment instrument or a decrease in use of one interface of the one or more payment interfaces associated with the payment instrument.

8. The apparatus of claim 1, wherein the logic circuitry is configured to pretrain a neural network or machine learning algorithm based on purchase histories, of multiple customers, that include transactions conducted via more than one transaction mode.

9. The apparatus of claim 1, wherein the logic circuitry is configured to pretrain a neural network based on purchase history associated with the customer, to train the neural network to recognize patterns of transactions specific to the customer.

10. A non-transitory storage medium containing instructions, which when executed by a processor, the processor to comprise a model and a malfunction determiner, the instructions, when executed, to cause the processor to perform operations to:
    receive transaction data about at least one transaction performed via a payment instrument associated with a customer, the transaction data to indicate a payment interface of the payment instrument through which the customer conducted the at least one transaction, the payment instrument comprising one or more payment interfaces;
    determine, by the model, a deviation from a transaction pattern by at least one interface of the one or more payment interfaces, wherein the model is trained by the processor based on the transaction data, the transaction data indicative of a past spending behavior of the customer; and
    determine, by the malfunction determiner, to contact a customer associated with the payment instrument, the determination based on the deviation and a threshold.

11. The non-transitory storage medium of claim 10, wherein the operations further comprise operations to determine that the deviation exceeds the threshold and determine send the customer a new payment instrument, to contact the customer to request input about a malfunction of the payment instrument, to offer a new payment instrument to the customer, or a combination thereof.

12. The non-transitory storage medium of claim 10, wherein the transaction data about the at least one transaction comprises a date, a time, a payment interface, a fallback indicator, an authorization or declination indicator, or a combination thereof.

13. The non-transitory storage medium of claim 10, wherein the one or more payment interfaces comprise a contactless interface and at least one contacted interface, wherein the at least one contacted interface comprises a magnetic stripe, a chip, or a combination of both.

14. The non-transitory storage medium of claim 10, wherein the model comprises a neural network or machine learning algorithm pretrained based on transaction data from multiple customers, the transaction data associated with customer requests for new payment instruments.

15. The non-transitory storage medium of claim 14, wherein the model comprises a neural network or machine learning algorithm pretrained based on transaction data from multiple customers, the transaction data including changes in transaction patterns, the changes in transaction patterns including information about transaction modes, wherein each transaction mode is associated with one of the one or more payment interfaces.

16. The non-transitory storage medium of claim 10, wherein the model comprises a neural network or machine learning algorithm pretrained based on transaction data from multiple customers, the transaction data including changes in transaction patterns prior to a decrease in a frequency of use of the payment instrument or a decrease in use of one interface of the one or more payment interfaces associated with the payment instrument.

17. The non-transitory storage medium of claim 10, wherein the model comprises a recurrent neural network, a logistic regression algorithm, or a gradient boosting engine.

18. The non-transitory storage medium of claim 10, wherein the operations further comprise operations to pre-train a neural network or machine learning algorithm based on purchase histories, of multiple customers, that include transactions conducted via more than one transaction mode.

19. The non-transitory storage medium of claim 10, wherein the operations further comprise operations to pre-train a neural network based on the purchase history associated with the customer, to train the neural network to recognize patterns of transactions specific to the customer.

20. A system comprising:
memory; and
logic circuitry coupled with the memory, the logic circuitry comprising a model and a trainer, the logic circuitry to:
provide transaction data associated with more than one customer;
identify for each of multiple customers of the more than one customer at least one request to obtain a new payment instruments;
determine, for the multiple customers of the more than one customer, a set of transaction data indicative of at least one transaction pattern leading to the requests to obtain the new payment instruments; and
train, by the trainer, the model based on the set of transaction data for the multiple customers, the model to output, in inference mode, a probability based on a deviation from the at least one transaction pattern that lead to the requests to obtain new payment instruments.

* * * * *